United States Patent
Rosenmund et al.

[15] 3,687,962
[45] Aug. 29, 1972

[54] METHOD OF MAKING PYRROLE DERIVATIVES

[72] Inventors: Peter Rosenmund, Dornigheim; Klaus Grubel, Julich, both of Germany

[73] Assignee: Friedrich-Karl Marcus, Geesthacht, Germany

[22] Filed: April 1, 1969

[21] Appl. No.: 812,301

[30] Foreign Application Priority Data

April 6, 1968 Germany.........P 17 70 141.6

[52] U.S. Cl........260/296 R, 260/239 E, 260/297 R, 260/313.1, 260/599, 260/601 H
[51] Int. Cl. .......................C07d 23/06, C07d 27/26
[58] Field of Search.....................260/313.1, 296 R

[56] References Cited

UNITED STATES PATENTS 2,488,336  11/1949  Scott ....................260/313.1

*Primary Examiner*—Alex Mazel
*Assistant Examiner*—Joseph A. Narcavage
*Attorney*—Beaman & Beaman

[57] ABSTRACT

Heterocyclic nitrogen compounds, especially aziridine and pyrrole derivatives, are formed by addition of organic acid chlorides at the carbon double bond of single-unsaturated hydrocarbon chlorinated at the carbon atom adjacent to the double bond, said addition taking place in the presence of a Lewis-acid at low temperatures. The obtained dichloroketone is reacted in a second stage with amines or ammonia to form the heterocyclic compound. At temperatures above 100° C pyrrole derivatives are obtained; below 100° C aziridine derivatives are formed. Heterocyclic nitrogen compounds with various substituents can be prepared from the correspondingly selected base substances.

11 Claims, No Drawings

METHOD OF MAKING PYRROLE DERIVATIVES

BACKGROUND OF THE INVENTION

Heterocyclic nitrogen compounds, especially pyrrole derivatives are widely spread in nature. Examples of this are blood pigment, chlorophyll, many alkaloids and albumen components. Therefore, pyrrole derivatives meet with considerable interest in the drug industry as basic substances for pharmaceutical products and in the chemical industry, here above all as starting substances for the production of pigments.

Although pyrrole was discovered in tar already in 1834 by Otto Runge and obtained in pure form for the first time in 1858 by Andersen and a plurality of pyrrole syntheses have been developed since, it has not been possible up to now to obtain heterocyclic nitrogen compounds, especially pyrrole and aziridine derivatives, in a simple manner with good yields, in particular pyrrole derivatives with more than two substituents. The basic substances were either difficult to obtain or expensive, or the yields were low (reference is made in this connection to the three volume by H. Fischer and H. Orth, which deals in particular with the pyrrole derivatives and their syntheses).

The object of the invention is a process for the production of heterocyclic nitrogen derivatives, especially pyrrole and aziridine derivatives, from available basic substances.

SUMMARY OF THE INVENTION

It has now been found that organic acid chlorides, such as acetyl chloride, propinonyl chloride, butyryl chloride, isobutyryl chloride, benzoyl chloride, nicotinic acid chloride, are added largely according to the rule of Markownikow at halogen compounds of singly unsaturated hydrocarbons which carry the halogen in neighbor position to the double bond, with a Lewis acid such as $AlC_3$, $BF_3$ (anhydrous) functioning as a catalyst. In this addition $\beta$, $\gamma$-dihalogen ketones are formed which, under suitable conditions, form with ammonia or primary amines heterocyclic nitrogen derivatives, which are substituted at least in the 2-

The process according to the invention is characterized in that a halogen compound of a single-unsaturated hydrocarbon of the general formula

(II)

wherein $R_1$, $R_2$ and $R_3$ may be hydrogen or a maybe halogenated straight-chain or branched-chain alkyl radical, is reacted with an acid chloride of the general formula

(III)

wherein $R_4$ may be a straight-chain or branched-chain alkyl radical or an aryl radical, in the presence of a Lewis-acid, and the obtained $\beta$, $\gamma$-dichloroketone having the general formula

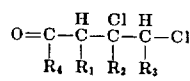

is reacted by heating, with an amine of the general formula

(V)

wherein $R_5$ may be hydrogen, a straight-chain or branched-chain alkyl radical, or a aryl radical, thereby forming the corresponding heterocyclic nitrogen compound by splitting off hydrogen chloride and eventually water.

The halogen compound of s single-unsaturated hydrocarbon and the acid chloride are charged in a mole ratio of up to 1 : 3. No solvent is necessary. If the acid chloride is expensive, the components are employed preferably in a mole ratio of 1 : 1.2. In this case the addition will be carried out in a solvent not participating in the reaction, such as dichloromethane or carbon disulfide.

The addition is carried out in the presence of a catalyst effective as an electron acceptor, for instance a Lewis-acid, such as aluminum chloride, boron trifluoride, at temperatures below $-10°$ C. The $\beta$, $\gamma$-dichloroketone obtained does not have to be isolated in its pure form prior to the reaction with the amine.

At least twice the quantity of amine calculated on the dichloroketone is used for the ring closing reaction. In order to preclude largely any interfering side reaction and to obtain good yields, it is recommendable, however, to employ between 5 and 10 moles amine per mol $\beta$, $\gamma$-dichloroketone. When using ammonia or a lower aliphatic amine, the reaction is carried out in the vapor phase, for instance, in an autoclave or a tubular reactor, and the heterocyclic nitrogen derivative formed in this reaction is removed from the reaction zone by means of water vapor distillation or some other suitable method.

According to this process, thus, the most various pyrrole derivatives may be formed, wherein the substituent in the 1-position namely $R_5$, is determined by the selection of the amine; the substituent in the 2-position i.e. the $R_4$, is determined by the selection of the amine; the substituent in the 2-position, i.e., the $R_4$, is determined by the selection of the type of the acid chloride, and the remaining substituents are determined by the selection of the single-unsaturated halogenated hydrocarbon (the positions 3, 4 and 5 being occupied by $R_1$, $R_2$ and $R_3$, respectively).

When preparing pyrrole derivatives according to the process of the present invention, the ring closure reaction is carried out by heating to a temperature of 100° C for a time longer than 1 hour.

The following reactions represent the steps taking place when practicing the process in accordance with the invention with acetyl chloride, allyl chloride and ammonia for the preparation of 2methyl-pyrrole

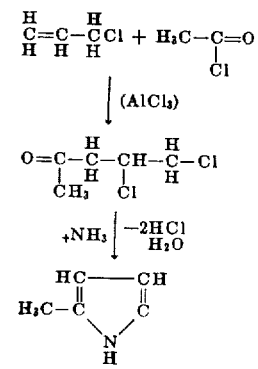

If one selects methallyl chloride, benzoyl chloride and aniline as basic substances, the reaction course is as follows:

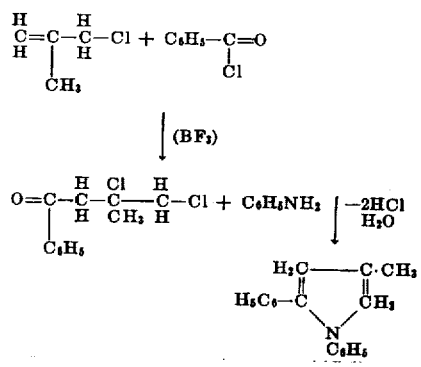

Starting from (1,4-dichloro)-2-butene and an acid chloride, and reacting the thus obtained addition product with an amine, so one will obtain a pyrrole derivative with a substituent in 3-position which, due to the reactive chlorine, will easily react into a pyrrole derivative with an amine radical in the side chain, which corresponds to the radical $R_5$.

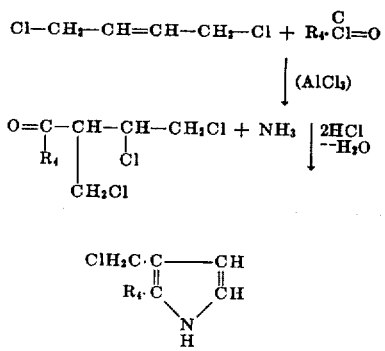

The following examples are intended to illustrate the process of the invention still more clearly but not to restrict in any way the invention.

It is thus possible by the process of the invention to produce pyrrole derivatives carrying not only one or two but up to five substituents, the type of each individual substituent being predetermined by selection of the basic substances for the analysis. Thus, the production of a plurality of new pyrrole derivatives has been made possible.

The invention relates also to the subsequent processing of these pyrrole derivatives into the pyrrolines and pyrrolidiness by hydration. Particularly the latter are above all of major importance for the production of pharmaceutical products, because now it has been made possible to obtain pyrrolidines with the respectively desired substituents in the desired positions. Pyrrolidines are components of quite a number of pharmaceutical products, and it is known that the pharmaceutical effect of a substance may be varied in a certain manner by alteration of the substituents thereof.

The above described method, however, also still may be modified in a simple manner so that aziridine deriva- tives are obtained. When carrying out the reaction of the $\beta,\gamma$-dichloroketone at a temperature below 100° C a ring closure reaction takes place with splitting-off only two molecules of hydrogen-chloride but no water that means that the keto group is maintained intact and an aziridine derivative of the general formula

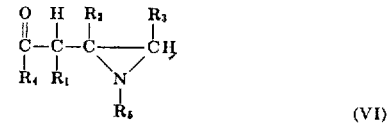

(VI)

is formed.

DESCRIPTION OF THE PREFERRED EMBODIMENTS

EXAMPLE 1

250 ml (= 278 g) acetyl chloride are charged into a 1 l three-neck bottle provided with an agitator and a thermometer, and 140 g (1.2 mol) aluminum chloride are slowly introduced at a temperature of −15° C. The amber colored suspension containing the molecule compound

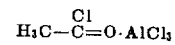

then has added thereto drop by drop, after the bottle has been provided with a dropping funnel, 76.5 g (1 mol) of allyl chloride as slowly that the temperature inside the bottle does not exceed −10 °C. As the reaction is strongly exothermic a good outside cooling must be provided so that splitting-off hydrogen chloride from the formed ketone may be prevented even at the end of the reaction. At the beginning, the solution becomes clear but a precipitation may occur at the end of the reaction. The mixture has a medium brown to red color. After having added the allyl chloride the agitation is still continued for approximately another quarter of an hour; then the batch is poured into 2,500 g ice water under strong agitation so that in the end there will still be a little ice left. The organic components are then extracted by means of dichloromethane which then is largely sucked off under vacuum at ambient temperature. The crude product remains as a transparent dark-brown liquid in a quantity of about 140 g (which is approximately 90 percent of theory) 4,5-dichloro-2-pentanon calculated on the allyl chloride charged. About 75 to 80 g of a colorless liquid with a hardly biting scent are distilled at 0,5 mm Hg between 48° − 52° C which, as has been proved by gas chromatography, consists of three different substances present in the ratio of 1 : 5 : 15. It may be assumed that the by-product obtained in smaller quantity is a product obtained by splitting off hydrogen chloride (acetyl allyl chloride) while the second by-product obtained in greater quantity is 3-chloromethyl-4-chloro-butanone which is not capable to be reacted to pyrroles. The desired compound 4,5-dichloro-2-pentanone is obtained in a quantity of 72 percent of the calculated value. The crude product may be kept for a relatively long period of time at a temperature of −15° C.

97 g of the non-distilled crude product obtained above (which corresponds to one half mol 4,5-dichloro-2-pentanone) are dissolved in about ten times the quantity of methanol and are reacted with 5 to 10 mole of a primary amine or ammonia at 200° C in an autoclave for 2 to 4 hours. The reaction product may be directly subjected to a water vapor distillation; but it is recommendable to draw off the solvent as well as a part of the excess amine before through a column in order to avoid unnecessary solvent losses. After processing the distillate of the water vapor distillation by separation of the pyrrole derivative from the aqueous phase in the usual manner and drying, 28 g of 2-methylpyrrole having a boiling point of 148° C were obtained when using ammonia which means 70 percent of the calculated value related to the quantity of 4,5-dichloro-2-pentanone, which was used as a starting substance.

EXAMPLE 2

The process was carried out as in Example 1 with the exception that ethyl amine was employed instead of ammonia. In this process, 1-ethyl-2-methyl-pyrrole having a boiling point of 155° – 159° C was obtained in a yield of 22.5 g, which is 62 percent of the theory.

EXAMPLE 3

The operation was carried out as in Example 1 but with butyric acid chloride used instead of the acetyl chloride. In this operation the 6,7-dichloro-4-eptanone (~83° – 90° C at 0.5 mm hg) was obtained as an intermediate product likewise not in a pure form, and was reacted with ammonia into 2-propylpyrrole (boiling point 0.9 hg: 44° – 45° C). The yield was 35 g corresponding to 69 percent.

With the addition of benzoyl chloride to methallyl chloride a mixture of reaction products was obtained which shows a boiling interval of 130° – 180° C at 200 mm Hg. This crude product was boiled under reflux with approximately 10 times the theoretic molar quantity of aniline for up to 14 hours. That portion of the reaction product which is soluble in chloroform showed a variety of substances in the thin-layer chromatography analysis on silica gel with benzene as eluent, that substance of which having the highest RF-value showing a distinct characteristic cinnamic aldehyde reaction. According to an estimation of the quantities of the individual substances, the yield of the ring closure reaction should lie between 50 and 65 percent.

EXAMPLE 4:

Acetylchloride was added to allyl chloride as is described in example 1 in the presence of AlCl₃. The 4,5-dichloro-2-pentanone-2 was subsequently heated with ammonia at temperatures below 100° C. One obtained 2-acetonyl-aziridine of the formula

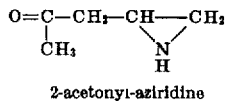

2-acetonyl-aziridine with a boiling point of 75° – 77° C, and a yield of 28 g, i.e. 60 percent of the theory.

The aziridine derivatives obtained in accordance with the invention are likewise important basic products for numerous syntheses. So, to state only one example, one may arrive at β-amino alcohols in that the keto-group is transformed into a tertiary alcohol group by reaction with a magnesium-organic compound and subsequently the aziridine ring is opened.

As will be seen from the above it has been made possible by the process of the invention to produce in a simple manner numerous already known as well as new derivatives of pyrrole, pyrroline, pyrrolidine and aziridine.

We claim

1. A process for the production of pyrrole derivatives, comprising the following steps:

a. reacting a halogen compound of a single-unsaturated hydrocarbon of the formula

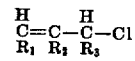

wherein $R_1$, $R_2$ and $R_3$ may be the same or different and are selected from the group consisting of hydrogen, lower alkyl and halogenated lower alkyl, with an acid chloride of the formula

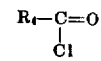

wherein $R_4$ is a member selected from the group consisting of lower alkyl, benzyl and pyridyl, in the presence of a Lewis acid, thereby obtaining a β, γ-dichloroketone of the formula

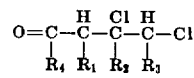

b. heating said dichloroketone at a temperature exceeding 100° C. for more than 1 hour with an amine of the formula

wherein $R_5$ is a member selected from the group consisting of hydrogen, lower alkyl and benzyl thereby forming the corresponding heterocyclic nitrogen compound by splitting off hydrogen chloride.

2. The process in accordance with claim 1, in which said Lewis acid is aluminum trichloride.

3. The process in accordance with claim 1, in which said single unsaturated hydrocarbon is a member selected from the group consisting of allyl chloride, methallyl chloride and 1,4-dichloro-2-butene.

4. The process in accordance with claim 1, in which said acid chloride is a member selected from the group consisting of acetyl chloride, propionyl chloride, butyryl chloride, isobutyryl chloride, benzoyl chloride and nicotinic acid chloride.

5. The process in accordance with claim 1, wherein the step a is carried out in a solvent which is inert under the conditions of reaction.

6. The process in accordance with claim 1, wherein the step a is carried out at temperatures below −10 ° C.

7. The process in accordance with claim 1, wherein said amine is ammonia and is reacted with the β, γ-dichloroketone in the vapor phase under elevated pressure.

8. The process in accordance with claim 1, wherein said amine is aliphatic amine and is reacted with the $\beta$, $\gamma$-dichloroketone in the vapor phase.

9. The process in accordance with claim 1, wherein the amine is dissolved in a solvent and at least partially is added to the dichloroketone as solution.

10. The process in accordance with claim 1, wherein said amine has a boiling point above 100 °C and is reacted with the $\beta$, $\gamma$-dichloroketone under normal pressure.

11. The process in accordance with claim 1, wherein obtained pyrrole derivatives are hydrogenated.

* * * * *